US012490346B2

(12) United States Patent
Reevell et al.

(10) Patent No.: US 12,490,346 B2
(45) Date of Patent: Dec. 2, 2025

(54) HEATER ASSEMBLY

(71) Applicant: JT International SA, Geneva (CH)

(72) Inventors: Tony Reevell, London (GB); Eduardo Jose Garcia Garcia, Grand-Saconnex (CH)

(73) Assignee: JT International SA (CH)

(*) Notice: Subject to any disclaimer, the term of this patent is extended or adjusted under 35 U.S.C. 154(b) by 871 days.

(21) Appl. No.: 17/635,174

(22) PCT Filed: Aug. 28, 2020

(86) PCT No.: PCT/EP2020/074149

§ 371 (c)(1),
(2) Date: Feb. 14, 2022

(87) PCT Pub. No.: WO2021/043691

PCT Pub. Date: Mar. 11, 2021

(65) Prior Publication Data

US 2022/0322498 A1 Oct. 6, 2022

(30) Foreign Application Priority Data

Sep. 6, 2019 (EP) .................................... 19196025

(51) Int. Cl.
*H05B 3/36* (2006.01)
*A24F 40/46* (2020.01)
*A24F 40/51* (2020.01)

(52) U.S. Cl.
CPC ............... *H05B 3/36* (2013.01); *A24F 40/46* (2020.01); *A24F 40/51* (2020.01); *H05B 2203/003* (2013.01); *H05B 2203/008* (2013.01)

(58) Field of Classification Search
None
See application file for complete search history.

(56) References Cited

U.S. PATENT DOCUMENTS 3,815,074 A 6/1974 Nagata
4,532,164 A 7/1985 Claunch, II et al.
4,752,670 A 6/1988 Traub et al.
4,777,351 A 10/1988 Batliwalla et al.
(Continued)

FOREIGN PATENT DOCUMENTS

CN 1887029 A 12/2006
CN 101796596 A 8/2010
(Continued)

OTHER PUBLICATIONS

Translation of EP-0295351-A1 (Year: 1988).*
(Continued)

*Primary Examiner* — Elizabeth M Kerr
(74) *Attorney, Agent, or Firm* — Lerner David LLP

(57) ABSTRACT

A heater assembly for an aerosol generating device includes a flexible heating element; a temperature sensor; and a flexible dielectric backing film with an adhesive on a surface of the flexible dielectric backing film, wherein the temperature sensor and the flexible heating element are supported adjacent to each other on the adhesive on the surface of the flexible backing film. The heater assembly allows for a more precise measurement of the heater temperature to be obtained while simplifying the assembly process.

16 Claims, 7 Drawing Sheets

(56) References Cited

U.S. PATENT DOCUMENTS

| | | | | |
|---|---|---|---|---|
| 5,286,952 | A | 2/1994 | McMills et al. | |
| 5,444,228 | A | 8/1995 | Gelus | |
| 2005/0082280 | A1 | 4/2005 | Ferguson | |
| 2005/0109768 | A1 | 5/2005 | Aoki et al. | |
| 2005/0109771 | A1 | 5/2005 | Bower et al. | |
| 2009/0020905 | A1 | 1/2009 | Privett et al. | |
| 2009/0297132 | A1 | 12/2009 | Abbott | |
| 2011/0097133 | A1 * | 4/2011 | Duru | A45D 40/26 219/241 |
| 2012/0138595 | A1 | 6/2012 | Watakabe et al. | |
| 2013/0042865 | A1 | 2/2013 | Monsees et al. | |
| 2014/0131904 | A1 | 5/2014 | Tang et al. | |
| 2017/0027226 | A1 | 2/2017 | Mironov et al. | |
| 2018/0071480 | A1 | 3/2018 | Tang et al. | |
| 2018/0116286 | A1 | 5/2018 | Polloni et al. | |
| 2020/0297032 | A1 | 9/2020 | Watanabe et al. | |
| 2022/0304116 | A1 | 9/2022 | Reevell et al. | |
| 2022/0312843 | A1 | 10/2022 | Reevell et al. | |
| 2022/0377853 | A1 | 11/2022 | Reevell | |
| 2023/0078670 | A1 | 3/2023 | Fraser et al. | |

FOREIGN PATENT DOCUMENTS

| | | | | |
|---|---|---|---|---|
| CN | 102548064 | A | 7/2012 | |
| CN | 102595943 | A | 7/2012 | |
| CN | 103747828 | A | 4/2014 | |
| CN | 203814582 | U | 9/2014 | |
| CN | 107708234 | A | 2/2018 | |
| CN | 107743364 | A | 2/2018 | |
| CN | 108013512 | A | 5/2018 | |
| CN | 108338415 | A | 7/2018 | |
| CN | 108601111 | A | 9/2018 | |
| CN | 208317035 | U | 1/2019 | |
| CN | 109674094 | A | 4/2019 | |
| CN | 114340420 | A | 4/2022 | |
| CN | 114342559 | A | 4/2022 | |
| CN | 114402696 | A | 4/2022 | |
| CN | 114788406 | A | 7/2022 | |
| CN | 115176520 | A | 10/2022 | |
| DE | 3780168 | T2 | 2/1993 | |
| EP | 0295351 | A1 * | 12/1988 | |
| EP | 2240045 | A2 | 10/2010 | |
| EP | 3248483 | A1 | 11/2017 | |
| FR | 2857907 | A1 | 1/2005 | |
| JP | S49004149 | A | 1/1974 | |
| JP | S60099634 | A | 6/1985 | |
| JP | S61144523 | A | 7/1986 | |
| JP | H087884 | A | 1/1996 | |
| JP | H08129312 | A | 5/1996 | |
| JP | H11102775 | A | 4/1999 | |
| JP | 2002313537 | A | 10/2002 | |
| JP | 2004152691 | A | 5/2004 | |
| JP | 2004296358 | A | 10/2004 | |
| JP | 2010175494 | A | 8/2010 | |
| JP | 2016031820 | A | 3/2016 | |
| JP | 2016110757 | A | 6/2016 | |
| JP | 2017127324 | A * | 7/2017 | A24F 40/57 |
| JP | 2018203580 | A | 12/2018 | |
| KR | 20120111367 | A | 10/2012 | |
| KR | 20160119776 | A | 10/2016 | |
| KR | 20190055771 | A * | 5/2019 | |
| KR | 20190058435 | A | 5/2019 | |
| TW | 201704015 | A | 2/2017 | |
| WO | 88010058 | A1 | 12/1988 | |
| WO | 2005055660 | A2 | 6/2005 | |
| WO | 2009098667 | A2 | 8/2009 | |
| WO | 201150964 | A1 | 5/2011 | |
| WO | WO-2011050964 | A1 * | 5/2011 | A24B 15/167 |
| WO | 2016160749 | A1 | 10/2016 | |
| WO | 2019111352 | A1 | 6/2019 | |
| WO | 2019127643 | A1 | 7/2019 | |

OTHER PUBLICATIONS

Translation of KR-20190055771-A (Year: 2019).*
Translation of JP-2017127324-A (Year: 2017).*
International Search Report for PCT/EP2020/074149 dated Oct. 21, 2020. 6 pgs.
International Search Report for PCT/EP2020/074150 dated Oct. 30, 2020. 4 pgs.
Search Report dated Nov. 28, 2023 from the Office Action for Chinese Application No. 202080062257.3 Issued Nov. 28, 2023, pp. 1-4.
Bo, F. et al., "Fabrication of Flexible Thermal Thin-film Sensor Array" Aviation Precision Manufacturing Technology, China Academic Journal Electronic Publishing House, Aug. 2011, pp. 1-14, vol. 47, No. 4. [English Translation of Abstract only].
Search Report dated Dec. 4, 2023 from the Office Action for Chinese Application No. 202080062299.7 Issued Dec. 7, 2023, pp. 1-4.
Lu, P. et al., "A flexible and transparent thin film heater based on a carbon fiber/heat-resistant cellulose composite" Composites Science and Technology, ELSEVIER Ltd, Contents lists available at ScienceDirect, Sep. 2017, pp. 1-6, vol. 153.
Communication pursuant to Article 94(3) EPC, for Application No. 20761279.7, dated Apr. 19, 2024, pp. 1-5.
Search Report dated Apr. 22, 2024 from the Office Action for Taiwanese Application No. 11320394390, 2 pages.
Ding, Li., Ergonomics, 1st ed. , Beijing University of Aeronautics and Astronautics Press, May 31, 2016. (An English-language version of the Action is submitted which indicates the degree of relevance of Ergonomics, 1st ed.). 2 pages.
Search Report dated May 10, 2024 from the Office Action for Chinese Application No. 202080062299.7 Issued May 11, 2024. 2 pages.

* cited by examiner

HEATER ASSEMBLY

CROSS-REFERENCE TO RELATED APPLICATIONS

The present application is a national phase entry under 35 U.S.C. § 371 of International Application No. PCT/EP2020/074149, filed Aug. 28, 2020, published in English, which claims priority to European Application No. 19196025.1 filed Sep. 6, 2019, the disclosures of which are incorporated herein by reference.

TECHNICAL FIELD

The present invention relates to a heater assembly, more particularly a heater assembly incorporating a thin film heater for an aerosol generating device.

BACKGROUND

Thin film heaters are used for a wide range of applications which generally require a flexible, low profile heater which can conform to a surface or object to be heated. One such application is within the field of aerosol generating devices such as reduced risk nicotine delivery products, including e-cigarettes and tobacco vapour products. Such devices heat an aerosol generating substance within a heating chamber to produce a vapour. One means to heat the consumable is to use a heater assembly comprising a thin film heater which conforms to a surface of a heating chamber to ensure efficient heating of an aerosol-generating substance within the chamber.

Thin film heaters generally comprise a resistance heating element enclosed in a sealed envelope of flexible dielectric thin film with contact points to the heating element for connection to a power source. These conventional thin film heaters, formed of a planar heating element sealed within an insulating thin film envelope, must then be attached to a surface to be heated. In the context of aerosol generating devices, this involves attaching the thin film heater to the outer surface of a heating chamber to form a heater assembly so as to transfer heat to an aerosol generating consumable placed within the chamber. This is generally achieved by attaching the thin film heater with an adhesive or other fastening means to hold the thin film heater against the heating chamber during use. Other techniques use additional pieces of thin film to wrap around the heater assembly to hold the thin film heater against the heating chamber. The thin film heater must then be connected to a power source when assembled in the device.

Often the temperature of such thin film heaters needs to be carefully monitored when employed in a device, for example to provide feedback to control circuitry to adjust the heater to a required heating temperature or to prevent the heating temperature exceeding a selected maximum temperature. For example, in the case of a controlled temperature aerosol generating device, the temperature must be carefully monitored and controlled to maintain the temperature of the heating chamber within a prescribed operating window to deliver efficient vapour delivery, without exceeding a temperature at which a consumable might burn.

One issue with known thin film heaters and heater assemblies is that conventional means for detecting the heating temperature lack the required level of accuracy and reliability. Known methods include mounting a temperature sensor within the device in proximity to the sealed dielectric envelope of the thin film heater or using monitored parameters of the heating element such as current, voltage and resistance to infer the heating temperature. These known methods are limited in the precision and accuracy with which they can measure the true temperature within a heating chamber. Furthermore the attaching of a heat sensor through known methods adds additional complexity to the assembly procedure, it is difficult to reproducibly position the temperature sensor in the same position across devices and the sensor can come loose or move during use of the device. Inferring the heating temperature using measured properties of the heater lacks precision due to inconsistencies in heater geometry and properties and the method requires more complex configuration of the hardware and software components.

The present invention aims to make progress in addressing these issues to provide an improved heater assembly for an aerosol generating device.

SUMMARY OF THE INVENTION

According to a first aspect of the invention, there is provided a heater assembly for an aerosol generating device comprising: a flexible heating element; a temperature sensor; and a flexible dielectric backing film with an adhesive on a surface of the flexible dielectric backing film, wherein the temperature sensor and the flexible heating element are supported adjacent to each other on the adhesive on the surface of the flexible backing film. With the heater assembly according to the present invention, the temperature sensor is incorporated into the thin film heater and positioned close to the heating element to provide a more precise measure of the heating temperature. The assembly process is also simplified by using the adhesive surface of the dielectric backing film to secure both the temperature sensor and the heating element.

The term "dielectric" used to define the backing film is intended to be interpreted broadly as meaning "electrically insulating". Preferably the flexible dielectric backing film has a thickness of less than 80 μm preferably less than 50 μm, and preferably a thickness of greater than 20 μm. The flexible dielectric backing film may comprise one or more of a fluoropolymer (such as PTFE), PEEK or polyimide.

The temperature sensor may be any known type of temperature sensor configured to sense the local temperature, where the sensed temperature can be provided as a signal to a PCB to monitor and/or control the heater. For example the temperature sensor may incorporate one or more of: a thermistor, a thermocouple, a resistance thermometer, a silicon bandgap temperature sensor, an integrated circuit sensor.

The adhesive may be for example a silicon adhesive. The adhesive provides a straightforward means of reliably securing the heating element and temperature sensor to the backing film. The flexible dielectric backing film may comprise a layer of adhesive, for example the film may comprise a fluoropolymer such as PTFE, PEEK or polyimide film with a layer of Si adhesive.

The assembled dielectric backing film, heating element and temperature sensor may be referred to as a thin film heater assembly or subassembly. When the thin film heater subassembly is attached to a heating chamber, this subassembly is referred to as a heating chamber subassembly. The term heater assembly applies to both of these subassemblies.

Preferably the heater assembly further comprises a second flexible dielectric film which opposes the flexible dielectric backing film to at least partially enclose the heating element; wherein at least a portion of the temperature sensor is positioned between the flexible dielectric backing film and the second flexible film. In this way, the temperature sensor is held within the dielectric envelope next to the heating element to provide an improved temperature reading. This simplifies the manufacturing process as the thin film heater subassembly (including the flexible heating element, temperature sensor, flexible dielectric backing film and second flexible dielectric film) may be handled as a complete integral subassembly in which the relative position of the heating element and temperature sensor is fixed, rather than requiring independent installation of the thin film heater and temperature sensor.

Preferably the second flexible film comprises a layer of heat shrink material which opposes the flexible backing film. In this way, the number of thin film heater layers is reduced, since the layer of heat shrink film provides both the function of sealing the heating element and temperature sensor with the flexible backing film and also the means of attaching the heating element to a heating chamber. Therefore the thermal mass of the heater assembly is reduced and the efficiency of heat transfer is enhanced. Furthermore, a secure attachment is provided by the heat shrink film in a simplified method in which sealing of the heating element and attachment may be carried out simultaneously. Heat shrinking provides a reliable close contact between the thin film heater and heating chamber to ensure effective heat transfer. The method further allows the heater to be placed accurately at the desired position on a heating chamber before heating to shrink the film and attach the heater at that position.

Preferably the layer of heat shrink film is attached directly against the heating element. In this way, the heating element is sealed directly between the flexible dielectric backing film and the layer of heat shrink such that an additional sealing layer is not required. In other words the heat shrink provides both a sealing layer and means of attachment. Preferably the layer of attached heat shrink film comprises an alignment region which extends beyond the heating element by a predetermined distance in a direction opposite to the direction of the extending contact legs. The alignment region can be used to position the heating area of the heater at the required position by aligning a top, marginal edge of the alignment region with an end of the heating chamber and attaching the thin film heater to the chamber using the heat shrink film. In this way, the heating area and temperature sensor are positioned at a known location along the length of the heating chamber from the end of the chamber.

Preferably the layer of attached heat shrink film comprises an attachment region which extends beyond the flexible backing film a direction approximately perpendicular to the direction of the extending contact legs. The attachment portion of the heat shrink is preferably arranged to extend around the heating chamber when attached to secure the heating element to the heating chamber. Preferably the attachment region of the heat shrink may extend sufficiently such that it can circumferentially wrap around an outer surface of the heating chamber. The attachment region may be in the form of a tubular portion of heat shrink which is sleeved around the heating chamber. For example, the heating element and supporting backing film may be wrapped into a tube and sleeved within the heat shrink. The tubular heat shrink and tubular thin film heater within may then be sleeved onto a heating chamber.

The heat shrink film may comprise one or more of polyimide, a fluoropolymer such as PTFE and PEEK. The heat shrink film is preferably a preferential heat shrink film arranged to shrink preferentially in one direction. For example the heat shrink film may be polyimide 208*x* tape manufactured by Dunstone. The heat shrink film may be in the form of an initially planar layer, i.e. a piece of heat tape arranged to be wrapped around the heating chamber or it may be in the form of a tube arranged to be passed around (i.e. sleeved on) a heating chamber and heated to shrink it to the surface of a heating chamber.

Preferably the flexible backing film comprises an edge region which is folded over on itself or over the second flexible film to at least partially enclose the temperature sensor within the fold. In this way, the temperature sensor is secured in position next to the heating element within the fold. The second flexible dielectric film may be attached first, with the edge region subsequently folded over to seal a peripheral edge of the dielectric backing film and second dielectric film and/or attach the second dielectric film to the flexible backing film. The edge region may be folded without the second dielectric film layer present to directly contact the temperature sensor and secure it within the fold. The edge region of the backing film may comprise a hole arranged to expose a portion of the temperature sensor when folded over onto the temperature sensor.

Preferably the temperature sensor comprises a temperature sensor head and electrical connections arranged to transport signals from the sensor head. Preferably the temperature sensor head is enclosed between flexible backing film and the second flexible film. In this way the sensor head is secured in a desired fixed position relative to the heating element while the temperature sensor connections remain free for connection to a PCB.

In some examples, the temperature sensor comprises a temperature sensor head and electrical connections arranged to transport signals from the sensor head; wherein the flexible backing film comprises an opening or a through-hole in the flexible backing film and temperature sensor is positioned such that the temperature sensor head lies on the opening or through-hole and is exposed through the flexible dielectric backing film. In this way, when the thin film heater assembly is wrapped around a heating chamber, the temperature sensor head may directly contact the surface of the heating chamber through the hole, thereby providing a direct measurement of the heating chamber, without any intervening insulating layers.

Preferably the heating element is a planar heating element comprising a heater track which follows a circuitous path over a heating area within the plane of the heating element and two contact legs for connection to a power source, the contact legs extending away from the heater track in the plane of the heating element; wherein at least the heating area of the heating element is enclosed between the flexible dielectric backing film and the second flexible thin film. Preferably the heater track is configured to provide substantially uniform heating over the heating area. The heater track path may be a serpentine or meandering path over the heating area and the heater track may have a substantially uniform width and thickness. Preferably the second opposing dielectric film, for example the layer of heat shrink film, encloses the heater track between the backing film and the opposing film layer, leaving the contact legs exposed. In this way the heater track is electrically insulated between the dielectric backing film and the heat shrink film whilst the contact legs are exposed such that they can be connected to a power source.

The contact legs may be sufficiently long to allow direct connection to a power source when the thin film heater is employed in the device. For example the length of the contact legs may be substantially equal or greater than one or both of the dimensions defining the heating area.

Preferably, the circuitous heater track path is shaped so as to leave a vacant region on the flexible dielectric backing film, unoccupied by the heating element; wherein the temperature sensor is held by the adhesive in the vacant region of the flexible backing film. This allows the temperature sensor to be fixed in close proximity to the heating element, within the heating area, so as to provide a more accurate measurement of the heating temperature.

Preferably the temperature sensor comprises a temperature sensor head and elongated electrical connections, the elongated electrical connections oriented substantially in the same direction as the contact legs of the heating element. This simplifies the process of connecting the heater legs and sensor connections to a PCB. In particular, the temperature sensor may be arranged such that the connection wires lie adjacent to the extended contact legs of the heater element when assembled in a device to allow for mutual support and/or ease of connection to a PCB.

In a further example, the flexible dielectric backing film comprises a first piece of film which supports the flexible heating element and a second piece of film which supports the temperature sensor, the first piece of film attached to the second piece of film. In particular the first piece of dielectric film and second piece of dielectric film may together be considered the flexible dielectric backing film. The first piece of flexible dielectric backing film may form a sealed dielectric envelop with an opposing second dielectric film which together seals the heating element. The second piece of dielectric film may be connected, for example by an adhesive surface, and support the temperature sensor. In this example, the heating element is sealed within an envelope of insulating thin film whereas the temperature sensor remains exposed such that it may be directly in contact with the heating chamber when assembled in a device. The second piece of flexible dielectric film may be provided by a piece of adhesive tape which is attached to a peripheral edge of the sealed dielectric envelop enclosing the heating element.

Preferably the flexible dielectric backing film comprises one or more of polyimide, a fluoropolymer such as PTFE and PEEK. The backing film may comprise a polyimide film with a layer of Si adhesive. When the backing film comprises a fluoropolymer it may comprise an at least partially defluorinated surface layer, formed for example by a surface treatment such as plasma and/or chemical etching. This allows for an adhesive to be applied to the treated surface which otherwise would not adhere given the extremely low friction surfaces provided by fluoropolymers.

The flexible heating element, the temperature sensor and the flexible dielectric backing film may together be referred to as a thin film heater subassembly, wherein the heater assembly further comprises: a heating chamber; and the thin film heater subassembly is wrapped around a surface of the tubular chamber with the temperature sensor held adjacent to the heating chamber. Preferably the thin film heater subassembly is wrapped around the heating chamber with the backing film against the outer surface of the hating chamber.

The heating chamber is preferably a tubular heating chamber, open at one or both ends to accept a consumable. The circumference of the heating chamber preferably closely matches the width of the heating element (the length in a direction perpendicular to the contact legs) such that the heating element provides one complete circumferential loop around the chamber. The heating chamber preferably comprises one or more indentations on an outer surface of the heating chamber where the indentations are preferably a plurality of elongate indentations running along a portion of the length of the heating chamber, periodically arranged around the circumference. The indentations therefore may provide longitudinal ridges running along a portion of the length of the internal surface of the heating chamber, configured to engage a consumable when inserted into the chamber to enhance heat transfer to the consumable.

Preferably thin film heater is wrapped around the heating chamber such that at least part of the temperature sensor is positioned within an indentation. In this way, a more accurate reading of the temperature within the heating chamber may be obtained.

In a further aspect of the invention there is provided an aerosol generating device comprising a heater assembly as set out in the claims. Preferably the aerosol generating device comprises control circuitry configured to receive a temperature measurement from the temperature sensor and control the power provided to the heating element.

BRIEF DESCRIPTION OF THE DRAWINGS

Embodiments of the invention will now be described, by way of example only, with reference to the accompanying drawings, in which.

DETAILED DESCRIPTION

Figure 1:
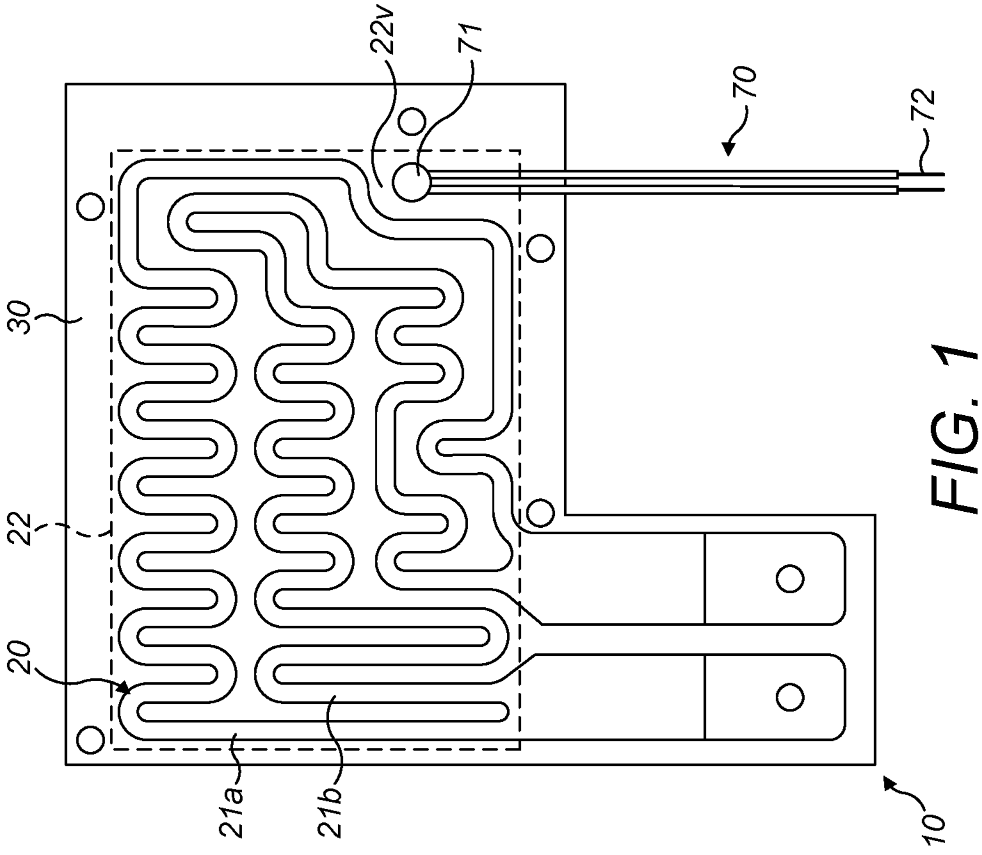
FIG. 1 schematically illustrates a thin film heater according to the present invention.

FIG. 1 schematically illustrates a heater assembly 10 for an aerosol generating device according to the present invention. The heater assembly 10 includes a flexible heating element 20, a temperature sensor 70 and a flexible dielectric backing film 30. The flexible dielectric backing film 30 includes an adhesive provided on a surface 31 of the flexible dielectric backing film 30 and the temperature sensor 70 and the heating element 20 are supported next to each other by the adhesive provided on the surface of the flexible backing film 30. These assembled components are referred to collectively as a thin film heater assembly or thin film heater subassembly 10.

Since the thin film heater subassembly 10 includes a temperature sensor 70 positioned directly adjacent to the flexible heating element 20 on the same surface of the flexible dielectric backing film, the temperature sensor 70 provides a highly accurate reading of the heating temperature provided by the heating element 20 and therefore can allow for accurate temperature control when the thin film heater subassembly is employed in an aerosol generating device or other heating device. This makes improvements over known devices in which the temperature sensor is generally separate from the heating element rather than being directly incorporated in the heater assembly 10.

The heating element is a planar heating element 20 including a heater track 21 which follows a circuitous path over a heating area 22 within the plane of the heating element 20. The heating element has two contact legs 23 allowing for connection to a power source, the contact legs 23 extending away from the heater track 21 in the plane of the heating element 20. The heater track is preferably shaped so as to provide substantially uniform heating over the heating area 22. In particular, the heater track is shaped such that it contains no sharp corners and has a uniform thickness and width, with the gaps between neighbouring parts of the heater track 22 being substantially constant to minimise increased heating at specific points within the heating area 22. The heater track 21 in the example of FIG. 1 follows a serpentine path over the heater area 22 and is split into two parallel track paths 21*a* and 21*b*, each connected to both contact legs 23. The heater layer 23 may be soldered at a connection point 24 on each contact leg 23 to allow for the connection of the heater to a PCB and power source.

The heating element 20 may be etched from a thin metal sheet of around 50 μm, for example a sheet of stainless steel such as 18SR or SUS304, although other materials and heater thicknesses may be selected depending on the application. The specific metal and thickness of the metal sheet are selected such that the resulting heating element 20 is flexible so that it can deform with the supporting flexible thin film 30 in order to conform to the shape of a surface to be heated. The metal sheet may be deposited initially on the surface flexible dielectric backing film 30, before being etched whilst supported on the film to form the heater track 21 pattern. Alternatively, the heating element 20 may be etched from a metal sheet independently of the flexible dielectric backing film 30. For example a free standing metal foil may be chemically etched from both sides in order to provide one or more connected heating elements 20 which are subsequently detached and positioned on the surface of a dielectric backing film 30.

The heater track 22 is preferably shaped so as to leave a vacant region 22*v* within the heating area 22, as most clearly shown in FIG. 1. The sensor head 71 is positioned in this vacant area 22*v* between the backing film 30 and the heat shrink 50 such that it is in close proximity with the heater track 21. By positioning the sensor head 71 in close proximity to the heating element 20, between the heat shrink 50 and the backing film 30, the temperature sensor 70 is sealed in close proximity to the heating element 20 to provide accurate temperature readings of the heating area 22.

The flexible dielectric backing film 30 must have suitable properties to provide a flexible substrate to support and electrically insulate the heating element 20. Appropriate materials include polyimide, PEEK and fluoropolymers such as PTFE. In this example the heating element comprises a heater track pattern 21 etched from a layer of 50 μm stainless steel 18SR which is supported on a single sided polyimide/Si adhesive film comprising a 25 μm polyimide film with a 37 μm silicon adhesive layer. The heating element 20 is supported on the adhesive to allow the heating element to be attached to the backing film 30. The heater assembly 10 of FIG. 1 may be prepared in advance and stored with a release layer which is attached to the adhesive surface supporting the heating element 20 to preserve the adhesive layer until it is ready for use. The release layer may be provided for example by polyester or similar material. The release layer can then be peeled off to uncover the sticky adhesive layers supporting the heating element 20 in order to proceed to the next assembly steps.

Figure 2:
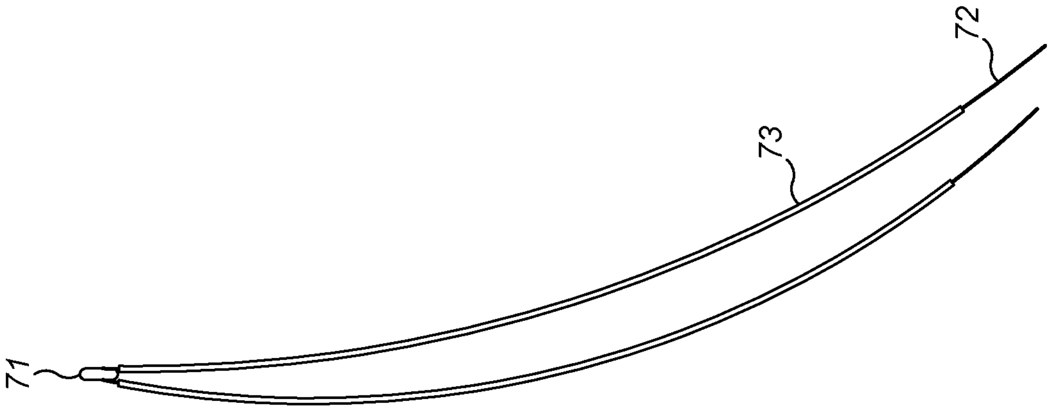
FIG. 2 schematically illustrates a thermistor used in the present invention.

In the example of FIGS. 1 and 2 the temperature sensor 70 is a thermistor, as shown more clearly in FIG. 2. The thermistor 70 includes a temperature sensing head 71 comprising a bead of material with temperature dependent resistance to allow for a temperature to be measured accurately via a reading of this resistance. The thermistor 70 further includes thermistor connections 72 in the form of wires connected to the sensor head 71, the wires 72 being of sufficient length such that they may be connected when the heater assembly 10 is employed in a device by connecting the thermistor connection 72 to the relevant connections of a PCB. The thermistor connections 72 further comprise an electrically insulating outer layer or sheath, for example provided by PTFE or polyimide tubing which sleeves the connections to prevent them from short circuiting by touching other conductive components within the device. The PTFE or polyimide tubing extends up to the temperature sensing head 71 and extends along the length of the resistor connection legs 72 leaving a portion of the end exposed for connection to the PCB. In the example of FIG. 1 the thermistor 70 is arranged on the surface of the flexible dielectric backing film 30 such that the sensor head 71 lies in the vacant region 22*v* of the heating area 22 formed by the curvature of the serpentine heater track 21, which leaves a portion of the adhesive supporting backing film 30 vacant to allow the thermistor 70 to be placed in close proximity to the heating track 21 to provide an accurate reading of the heating temperature.

The thin film heater subassembly 10 as shown in FIG. 1 may then be attached to a heating chamber 60 to form a heating chamber assembly 100, for example by wrapping the thin film heater subassembly 10 around a tubular heating chamber 60 to heat the surface of the heating chamber. The heating temperature can then be measured with the temperature sensor 70 to a high precision, given its proximity to the heating element 20.

The thin film heater subassembly 10 may take a number of different forms, with the positioning of the temperature sensor 70 and the attaching of the heater subassembly 10 to the heating chamber 60 achieved in a number of different ways within the scope of the present invention.

Figure 3:
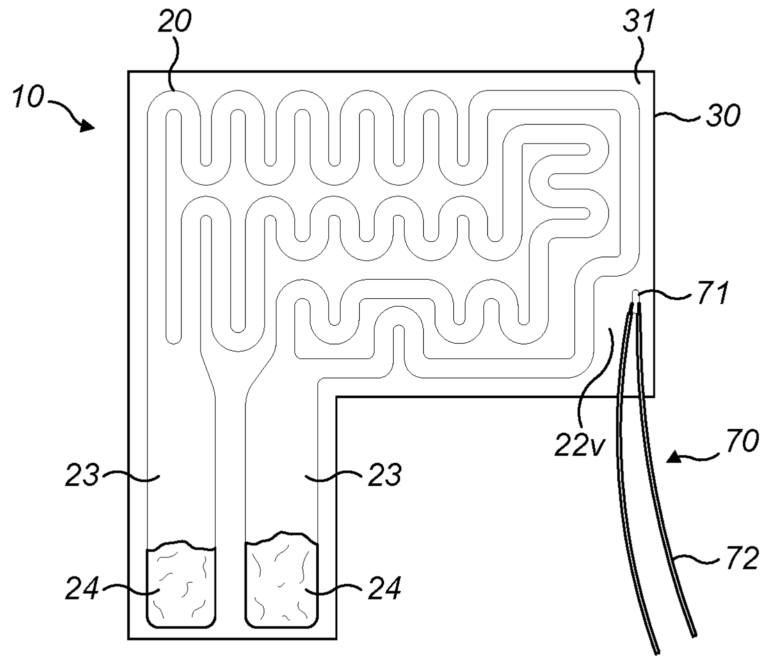
FIG. 3 schematically illustrates a thin film heater according to present invention.

FIG. 3 illustrates a thin film heater subassembly 10 according to the present invention which additionally includes a second flexible dielectric film 31 which opposes the flexible dielectric backing film 30 so as to enclose the heating element 20 and a portion of the temperature sensor 70 between the flexible dielectric backing film 30 and the second flexible film 31. The overlaid dielectric film layers 30, 31 together form a sealed enveloped enclosing the heating element 20 and the temperature sensor head 71 of the temperature sensor 70 between the layers 30, 31. The thin film heater subassembly 10 illustrated in FIG. 3 is formed by initially positioning the heating element 20 onto the adhesive surface of a flexible dielectric backing film 30. The temperature sensor 70 is then positioned adjacent to the heating element 20 on the adhesive surface of the backing film 30 with the sensor head 71 positioned in the vacant region 22*v* within the heating area 22 of the heating element 20. An opposing flexible dielectric layer 31 with an adhesive surface is then positioned onto the heating element 20 such that the heating element is positioned between the adhesive surfaces of the backing film 30 and the second dielectric film 31.

As with conventional thin film heaters, the dielectric layers may be heat sealed to form a sealed insulating envelope, enclosing the heating element 20. The difference in the present case being that the sensor head 71 and a portion of the temperature sensor connections 72 are sealed within the dielectric envelope together with the heating element 20. The sealed dielectric envelope may be cut to trim the dielectric films closer to the parameter of the heating element 20 to provide a thin film heater 10 as shown in FIG. 3. As with conventional thin film heaters, portions of the extending contact legs 23 may be exposed, for example by die cutting, and may be soldered at solder point 24 to provide areas which can be connected to a power source and PCB. The thin film heater 10 illustrated in FIG. 3 therefore incorporates the temperature sensor 70 within the dielectric envelope with the heating element 20 and as such the temperature sensor (in this case a thermistor) can measure the heating temperature with increased accuracy in comparison to known arrangements in which a temperature sensor is incorporated as an individual element separated by a number of dielectric layers.

Figure 4:
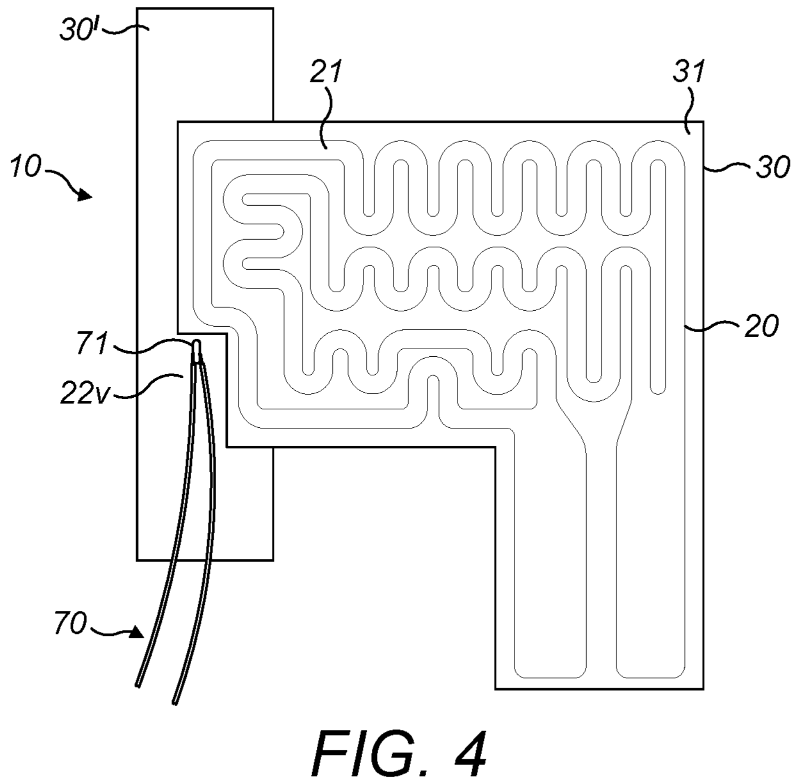
FIG. 4 schematically illustrates a thin film heater according to the present invention.

FIG. 4 illustrates an alternative thin film heater subassembly 10 according to the present invention. In this case, the flexible dielectric backing film 30 comprises two components. A first dielectric thin film part 30 supports the heating element 20 but in this case a second, connected dielectric thin film part 30' supports the temperature sensor 70. In particular the heating element 20 is positioned on a flexible dielectric backing film 30 with a second flexible dielectric film 31 opposing the backing film to enclose the heating element 20 in a sealed dielectric envelope which does not include the temperature sensor 70. Instead, a second adhesive dielectric backing film part 30' is connected adjacent to the first backing film part 30 and the temperature sensor head 71 is attached on an adhesive surface of the second flexible backing film part 30.

The second part of the flexible dielectric backing film 30' may be attached to an edge portion so as to extend the first backing film part 30 into the vacant region 22*v* provided by the curved path of the heater track 21. The sensor head 71 is therefore positioned in close proximity to the heating element 20 to read the heating temperature with increased accuracy. Furthermore, since the temperature sensor 70 is not sealed within the dielectric envelope 30, 31 but exposed on a surface of the dielectric backing film 30', when the thin film heater 10 is attached to the outer surface of a heating chamber 60 the temperature sensor head 71 may be held in direct contact with the surface of the heater chamber 60 to provide a more accurate reading of the heater chamber temperature.

The thin film heaters 10 shown in FIGS. 3 and 4 can be connected to the outer surface of a heating chamber 60 in a number of ways. Often, the heating chamber 60 of an aerosol generating device is a tubular heating chamber and the thin film heater subassembly of the present invention 10 can be attached around an outer surface of the heating chamber 60 such that the heating element 20 is in close proximity with the surface of the heating chamber 60 to provide efficient thermal transfer to the heating chamber 60. The thin film heaters 10 may be attached, for example with adhesive provided on one surface of the thin film heater or with additional pieces of adhesive tape. A particularly advantageous means of attaching the thin film heaters of FIGS. 3 and 4 utilises heat shrink film 50 which can be used to wrap around an outer surface of the thin film heater subassembly 10 and the heating chamber 60 and heated to contract and tightly attach the thin film heater 10 to the heating chamber.

Figure 5A:
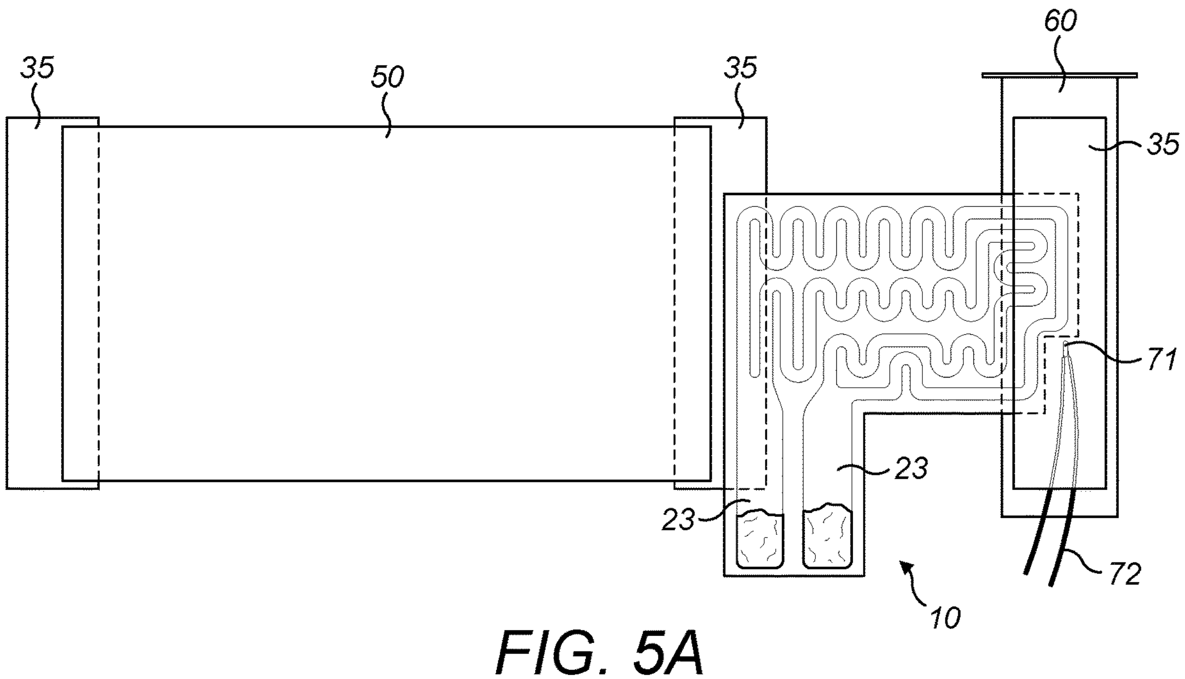
FIGS. 5A and 5B schematically illustrates a means to attach a thin film heater according to the present invention to a heating chamber to provide a heater assembly for an aerosol generating device according to the present invention.
Figure 5B:
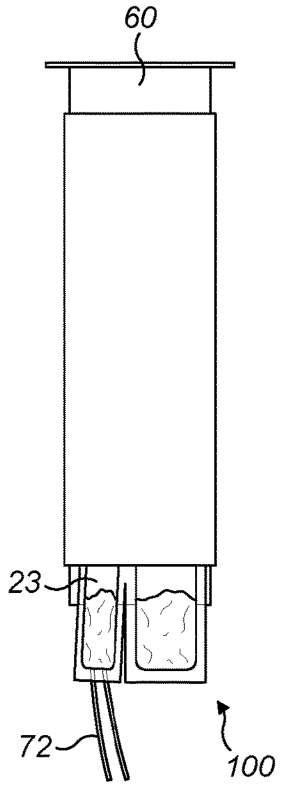

FIGS. 5A and 5B illustrate a method of attaching thin film heater subassemblies 10 (such as those shown in FIGS. 1, 3 and 4) to the outer surface of a heater chamber 60 using heat shrink material 50. In particular, as shown in FIG. 5A, a strip of heat shrink material 50 is attached to an edge of the thin film heater 10, for example using a piece of adhesive tape 35. The side of the thin film heater 10 in which the thermistor 70 is positioned is first attached to the outer surface of the heating chamber 60, again for example using a piece of adhesive tape 35. In this way, the side of the thin film heater 10 holding the thermistor head 71 is first attached to the heating chamber 60 so that the thermistor 70 can be accurately positioned. In the case of a thin film heater according to FIG. 3 in which the temperature sensor is sealed within a dielectric envelope 30, the backing film 30 is positioned against the heating chamber with the sealed temperature sensor head 71 separated from the surface of the heating chamber 60 by one layer of the dielectric backing film 30. In the case of a thin film heater subassembly 10 according to FIG. 4 in which the temperature sensor 70 is exposed, with the temperature sensor head 71 provided on the adhesive surface of a second part of flexible dielectric backing film 30', the temperature sensor head 71 is attached directly to the surface of the heating chamber 60. The sensor connections 72 preferably extend in the same direction as the contact legs 23 of the heating element 20, which assists with the connection of the heater legs 23 and the sensor connections 72 to the PCB.

The heating chamber 60 is a tubular heating chamber arranged to accept a consumable to be heated in order to generate a vapour to be inhaled by a user. The heating chamber 60 preferably has one or more indentations 61 on an outer surface which provide internal protrusions which assist with the positioning and heat transfer to a consumable received within the chamber 60. The circumference of the heating chamber 60 preferably closely matches the width of the heating element 20 (the length in a direction perpendicular to the direction of extension of the contact legs) such that the heating element provides one complete circumferential loop around the chamber 60. In other examples the heater element might be sized to wrap more than once around the circumference of the heating chamber, i.e. the heating element may be sized so as to provide an integral number of circumferential loops around the heating chamber so as not to produce any variation in the heating temperature around the circumference of the heating chamber. The thin film heater assembly 100 is positioned and attached such that the temperature sensor head 71 lies within an indentation 61 on the outer surface on the heating chamber 60 to provide a more accurate reading of the internal temperature of the heating chamber 60.

After attaching the first edge of the thin film heater subassembly 10 to the surface of the heating chamber, the thin film heater is wrapped around the outer surface of the heating chamber 60 with the extending piece of heat shrink film 50 wrapping around the heating chamber and over the flexible dielectric backing film 30 and heating element 20 before being secured with adhesive tape 35 to the outer surface of the heating chamber 60. In this way, a heating chamber subassembly 100 is provided as shown in FIG. 5B in which the thin film heater subassembly 10 is wrapped around the outer surface of the heating chamber 60 with the flexible dielectric backing film 30 in contact with the surface of the chamber and the temperature sensor in close proximity to both the heating element 20 and the heating chamber 60. By heating the heating chamber subassembly 100 the heat shrink film contracts tightly sealing the heating element 20 against the outer surface of the heating chamber. This method therefore provides an efficient and reliable means of assembling a heating chamber assembly 100 to provide a temperature sensor 70 in close proximity to the heating chamber 60. Furthermore, as the temperature sensor connections 72 extend approximately in the same direction as the extension of the contact legs 23, as can be seen from FIG. 5B, the temperature sensor connections 72 and the heater contact legs 23 are aligned next to each other when the heater assembly is assembled. This improves the ease with which the heater contact legs and the sensor connections 72 can be connected to a PCB.

As described above, using a strip of heat shrink tape 50 provides an efficient means of securely fastening the thin film heater 10 to a heating chamber 60. FIG. 6 illustrates a further optimised method in which a layer of heat shrink material 50 is used to both seal the heater track 21 and temperature sensor 70 against the backing film 30 and also to provide means of attaching the thin film heater assembly 10 to a heating chamber 60. The following method therefore provides a more efficient means of attaching and sealing the heating element and temperature sensor in which the number of parts is reduced and accordingly heat transfer to the heating chamber 60 is enhanced given the reduced thermal mass of the thin film heater assembly 10.

Figure 6A:
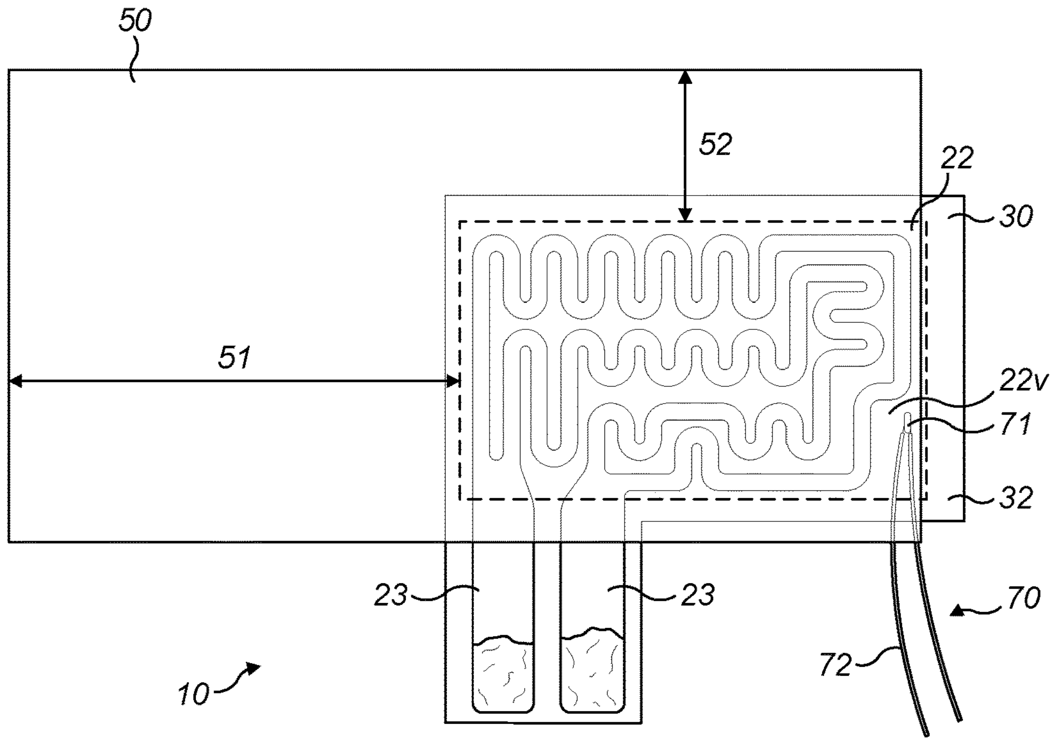
FIG. 6A to 6D schematically illustrates an alternative method of attaching a thin film heater according to the present invention to a heating chamber to provide a heater assembly according to the present invention.

In FIG. 6A, as before the heating element 20 and the temperature sensor 70 (again, in this case a thermistor) are supported adjacent to each other on the adhesive surface of a flexible electrically insulating backing film 30. The sensor head 71 is positioned in a vacant corner region **22*v* of the heating area 22 on the backing film and is held by the adhesive between the backing film 30 and heat shrink 50, next to the heating element 20. This example differs from the thin film heaters 10 of FIG. 3 and FIG. 4 in that a layer of heat shrink film 50 is applied directly onto the surface of the heating element 20 and the dielectric backing film 30 so as to at least partially enclose the heating element 20 and the temperature sensor head 71 between the heat shrink film 50 and the backing film 30. The heat shrink film 50 can be attached with the adhesive directly onto the surface of the heater element 20 so as to enclose the heating area 20 between the backing film 30 and the heat shrink 50. In particular, the heater track 21 is insulated within a sealed envelope formed by the flexible backing film 30 and the heat shrink 50, while the contact legs 23 remain exposed to allow connection to a power source. The thermistor connections 72 extend down away from the backing film 30 in a similar direction to the contact legs 23** to aid connection with the PCB when assembled within a device.

The heat shrink 50 is larger than the backing film 30 and heating element 20 such that it extends beyond the heating element 20 by predetermined distance in two orthogonal directions 51, 52. This alignment of the heat shrink 50 relative to the heating element 20 allows for the later alignment of the heating area 20 relative to the heating chamber 60. Therefore, careful control of the size of these extending portions of the heat shrink 51, 52 at this stage allows for the heater assembly 100 to be attached to a heating chamber 60 in a straightforward manner to provide precise alignment. The heat shrink 50 extends beyond the heating area 20 in a direction opposite to the contact legs 23 to provide an alignment region 52 of the heat shrink 50. This alignment region 52 can be aligned with the top edge of a heating chamber 60 such that the heating area 20 is positioned at a position along the length of the heating chamber corresponding to the predetermined length 52 of the alignment region from the top edge of the heater track 21. In this way, the heater element 20 can be provided at a correct position along the heating chamber 60.

The heat shrink 50 also has an attachment region 51 which extends past the heater track 21 and backing film 30 in a direction perpendicular to the direction of extension of the contact legs 23 to provide an attachment region 51. The direction of extension of the attachment region 51 may be referred to as the "wrapping direction" since this portion of the heat shrink 50 allows for it to be wrapped around a tubular heating chamber 60 and subsequently heat shrunk to provide the required tight connection. Similarly, the direction opposite to the heater legs 23 in the direction that the alignment region 52 extends from the heating element 20 may be referred to as the upward or alignment direction which corresponds with the elongate axis of the heating chamber 60, directed towards the top open end. These extension distances 51, 52 may be configured by cutting the heat shrink 50 to the correct dimensions either before or after attaching to the surface of the dielectric backing film 30.

Figure 6B:
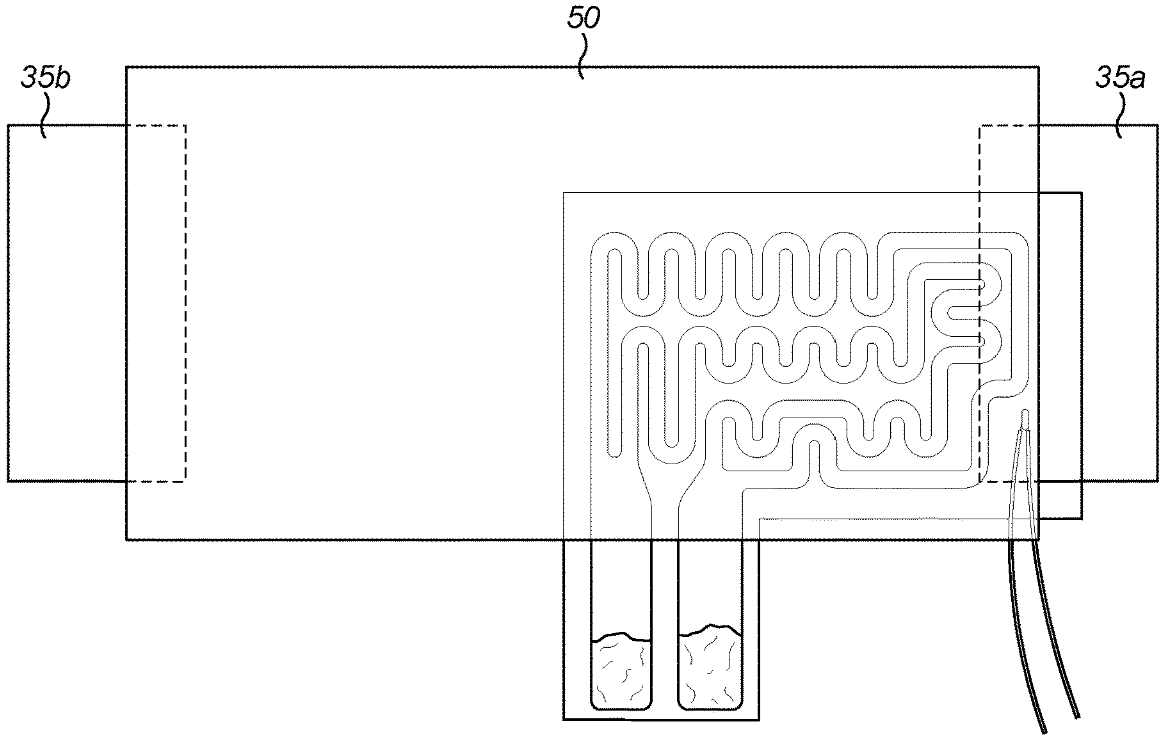
Figure 6C:
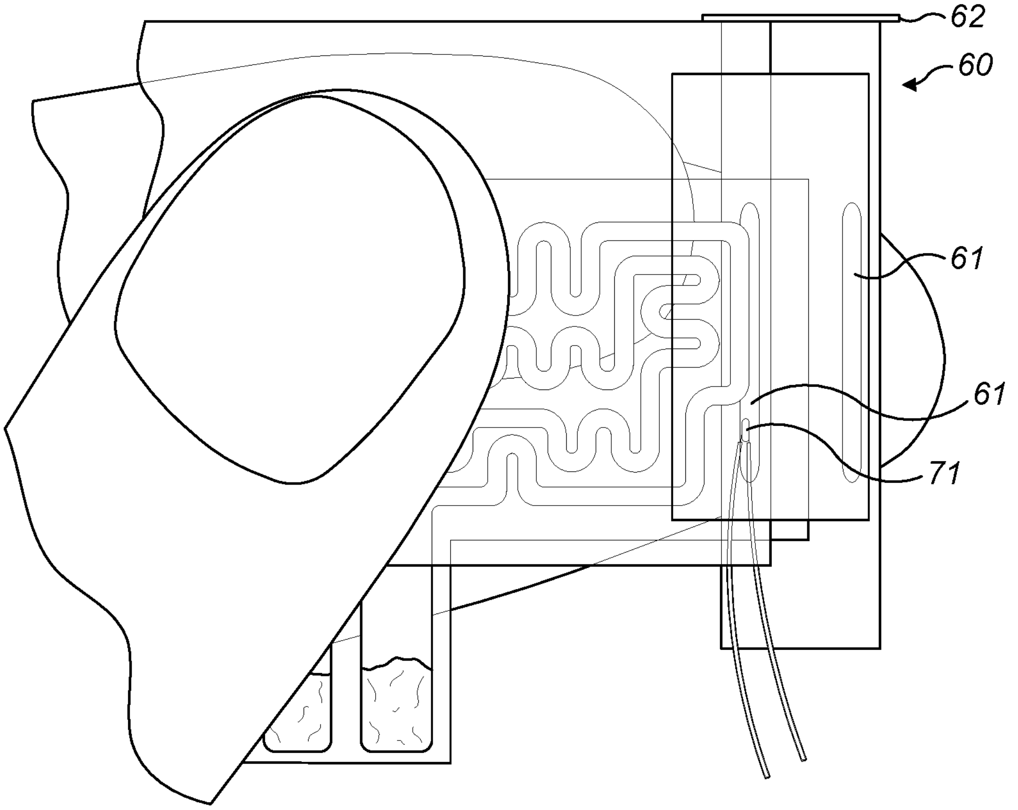

As shown in FIG. 6A the heat shrink 50 is preferably positioned so as to leave a free edge region 32 of the backing film 30 exposed. As illustrated in FIG. 6B, this free edge region 32 is folded over onto the heat shrink film 50 to seal an edge of the backing film 30 and heat shrink 50. In particular, as the free edge region 32 comprises an adhesive on the surface this can be used to fold over the heat shrink 50 to seal this edge region. This can also be used to fold over the temperature sensor head 71 to secure it within the fold, in a manner similar to that shown in FIG. 1, although in this case the heat shrink 60 covers the temperature sensor directly, before the free edge region is folded over on to the heat shrink 60 covering the sensor 71.

In the method of FIG. 6 the next step is to attach two pieces of adhesive tape **35*a*, 35*b* to attach the thin film heater assembly 10 to the heating chamber 60 at the correct position before heating the assembly to shrink the heat shrink. The sticky tape 35*a*, 35*b* may be provided by pieces of polyimide adhesive tape, for example 0.5 inch polyimide tape with 12.7 micrometre polyimide and 12.7 micrometre silicon adhesive. The adhesive attachment tape 35*a*, 35*b* is positioned along each edge of the heat shrink at the extremities in the wrapping direction. As shown in FIG. 6C, the thin film heater 10 may then be attached to the heating chamber 60 by aligning the top edge 53 of the heat shrink 50 with the top edge 62 of the heating chamber 60. Given the distance 52 of the alignment region has been carefully selected this alignment step allows for the heating area 22 to be placed at the correct position along the heating chamber 60**. Certain consumables will contain a charge of aerosol generating substance at a particular position along the length of the consumable so it is important that the correct portion of the heater chamber is heated to efficiently release the vapour from the consumable.

The thin film heater assembly 10 is initially attached to the heating chamber using the adhesive tape **35*a* neighbouring the thermistor 70. The heating chamber 60 is as described above, having one or more indentations 61 on an outer surface which provide internal protrusions which assist with the positioning and heat transfer to a consumable received within the chamber 60. The thin film heater assembly 10 is positioned and attached such that the temperature sensor head 71 lies within an indentation 61 on the outer surface on the heating chamber 60. In this way the temperature sensor 70 provides a more accurate reading of the internal temperature of the heating chamber 60**.

Figure 6D:
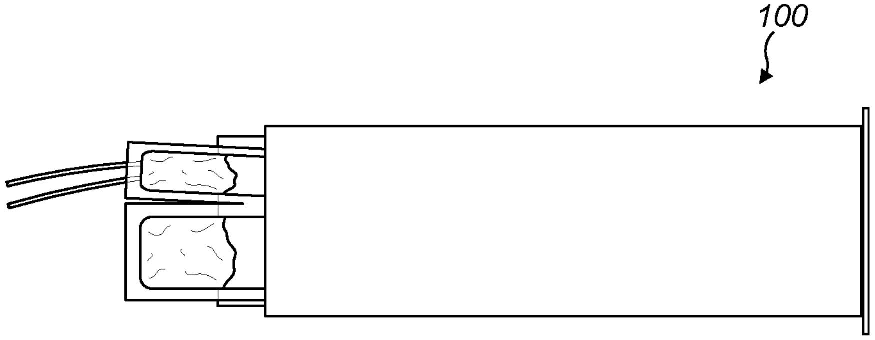

Once attached with first adhesive tape portion **35*a*, the thin film heater assembly 100 is then rolled around the heating chamber 60 with the extended attachment portion 51 of the heat shrink 50 wrapping circumferentially around the chamber 60 to cover the heating element 20 again before being attached by the second piece of attachment tape 35***b* to provide the heater chamber subassembly 100 shown in FIG. 6D. Since the length of the attachment region 51 is approximately the same as the length of the heating area 22 (and the circumference of the heating chamber 60), the attachment portion 51 wraps around to cover the heating area 22 once, such that the heater element is insulated by two outer layers of heat shrink film in the attached heater chamber assembly 100 in FIG. 6D. The attachment region may be sized to provide more than one additional covering of the heating element 20. For example the attachment region 51 may extend beyond the heating element by a distance corresponding to an integer multiple of the outer circumference of the heating chamber 60.

As can be seen in FIG. 6D the temperature sensor connections 72 and the heater legs 23 are positioned such that they are aligned following this step for ease of connection to the PCB and to provide mutual support. The attached heater assembly 100 is then heated to shrink the heat shrink 50 tight against the heating chamber 60. For example, the assembly 100 can be heated in an oven at around 210° C. for ten minutes to shrink the film 50, although the time and temperature can be adapted for other varieties of heat shrink. This process allows large numbers of units to be heat treated in a small oven at the same time. This is the only heating step which can both simultaneously seal the thin film heater to the heating chamber and bond the backing film to the heat shrink.

Finally, although not essential, a final layer of dielectric film 36 may be added around the outside of the heating element to complete the heater chamber subassembly. This final dielectric layer may be for example a further layer of adhesive polyimide such as 1 inch polyimide tape with 25 micrometre polyimide and 37 micrometres silicon adhesive. This outer layer of dielectric film 36 provides a further layer of insulation and further secures the attachment of the thin film heater 10 to the heating chamber 60. The thickness and/or material of the backing film 30, heat shrink 50 and final insulating layer 36 may be selected to enhance heat transfer to the heating chamber, for example with lower thermal conductivity layers provided outside the heating element (i.e. for the heat shrink 50 and insulating layer 36 in this example) and a higher thermal conductivity layer provided as the backing film 30. The thermistor 70 of this example is only separated from the heating chamber 60 by the thin backing film, which has high thermal conductivity, allowing an accurate reading of the temperature of the chamber.

As discussed above, one of the advantages of using an exposed temperature sensor (such as in FIG. 4) which is not sealed between the dielectric layers is that the temperature sensor head can be in direct contact with a heating chamber 60, allowing for a highly accurate temperature reading to be obtained. These advantages can be achieved with the above described benefits in terms of assembly time and precision provided by the heat shrink method of FIG. 6 by making certain additions to the above described methods.

Figure 7B:
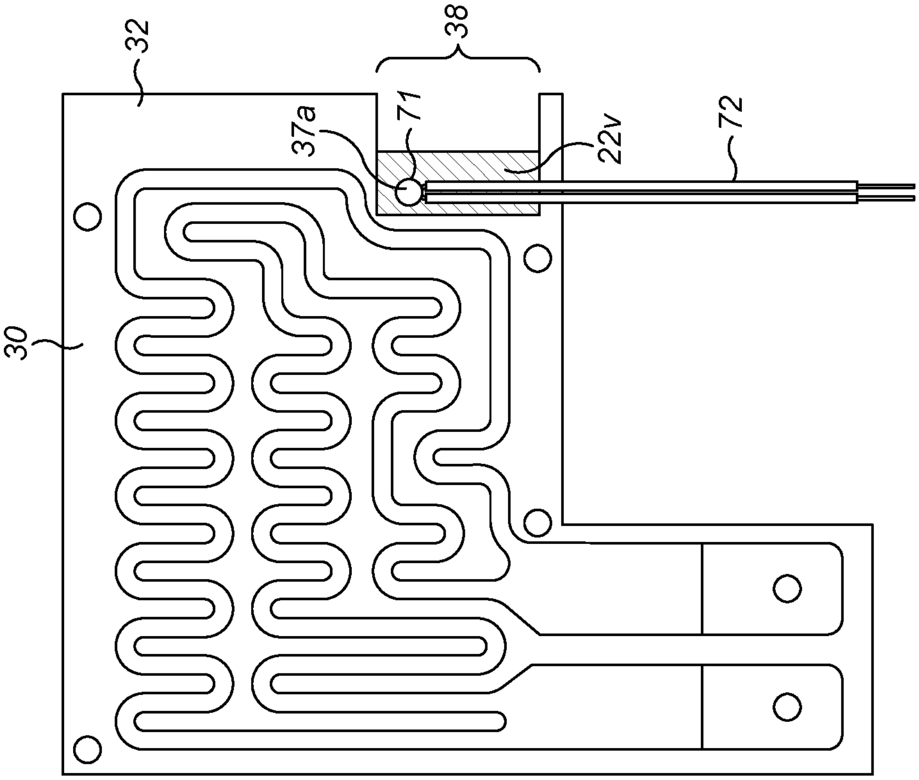
FIGS. 7A to 7D schematically illustrate a method for assembling a thin film heater according to the present invention.
Figure 7A:
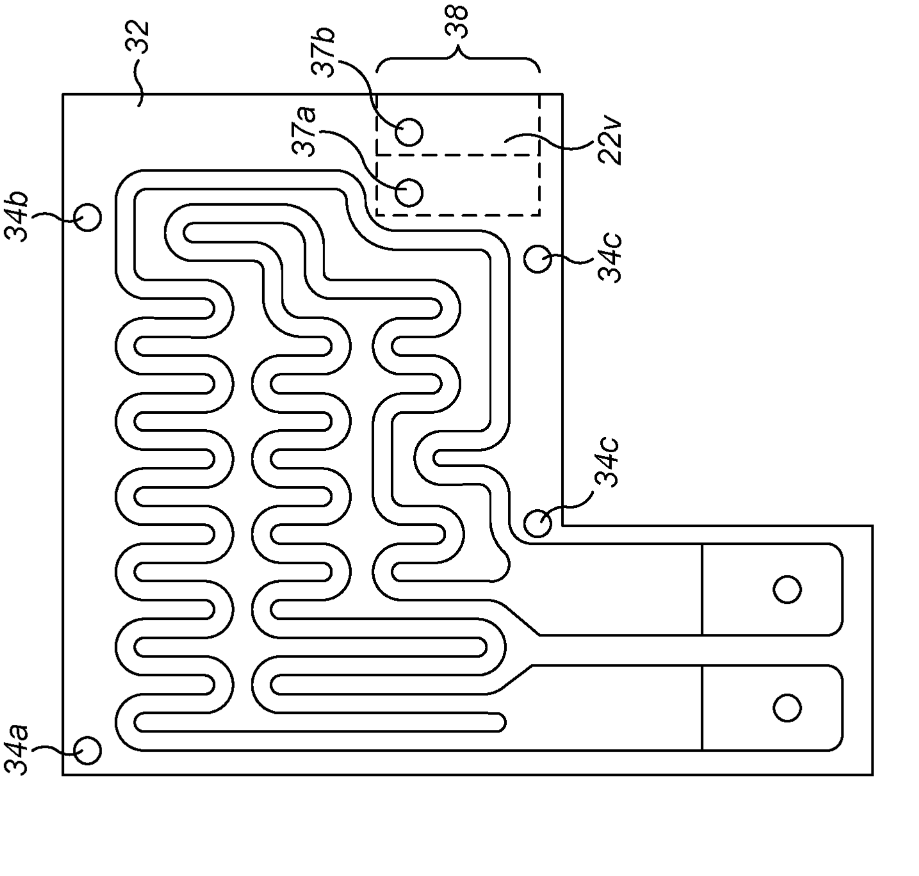

In FIG. 7A, as before the heating element 20 is provided on the adhesive surface of a flexible dielectric backing film 30. However this thin film heater 10 differs in that the flexible dielectric backing film 30 comprises a through hole 37*a*, on which the thermistor sensor head 71 is positioned, so as to expose the temperature sensing head 71 of the thermistor 70 through the backing film 30. As shown in FIG. 7B, the thermistor sensor head 71 is positioned on the thermistor hole 37*a* in the vacant region 22*v* of the backing film 30 such that the sensor head is exposed through the backing film 30 to the opposing side of the thin film heater. Since the thin film heater is attached to the heating chamber 60 with the backing film in direct contact, the thermistor hole 37*a* allows for the thermistor sensor head 71 to be in direct contact with the heating chamber 60.

Figure 7C:
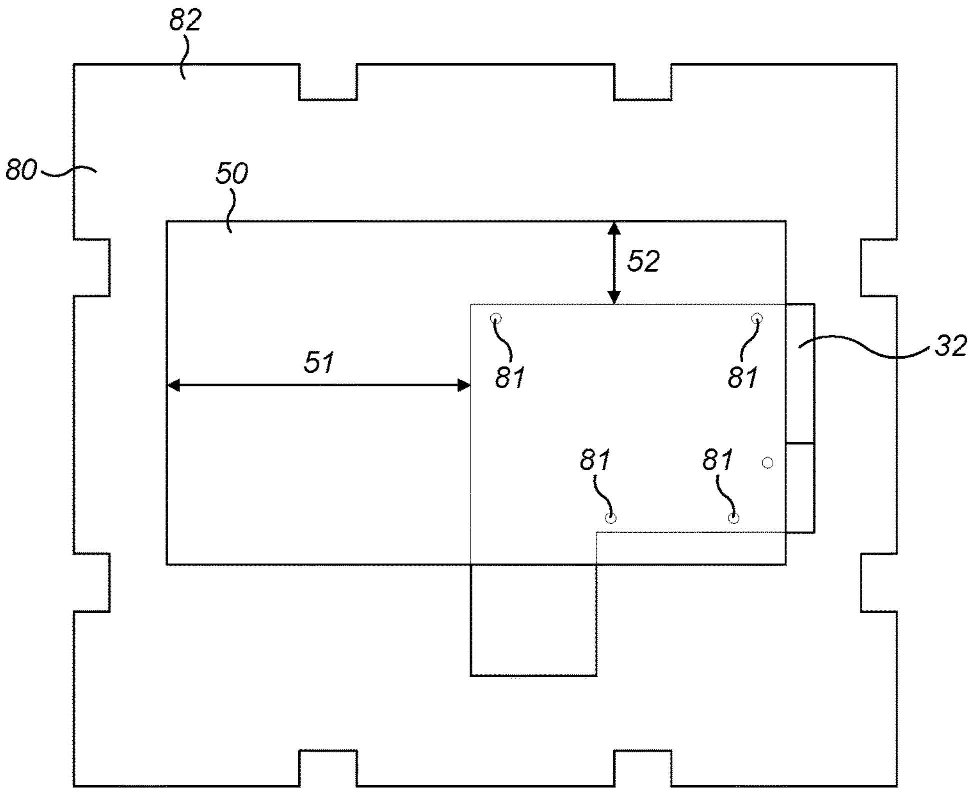
Figure 7D:
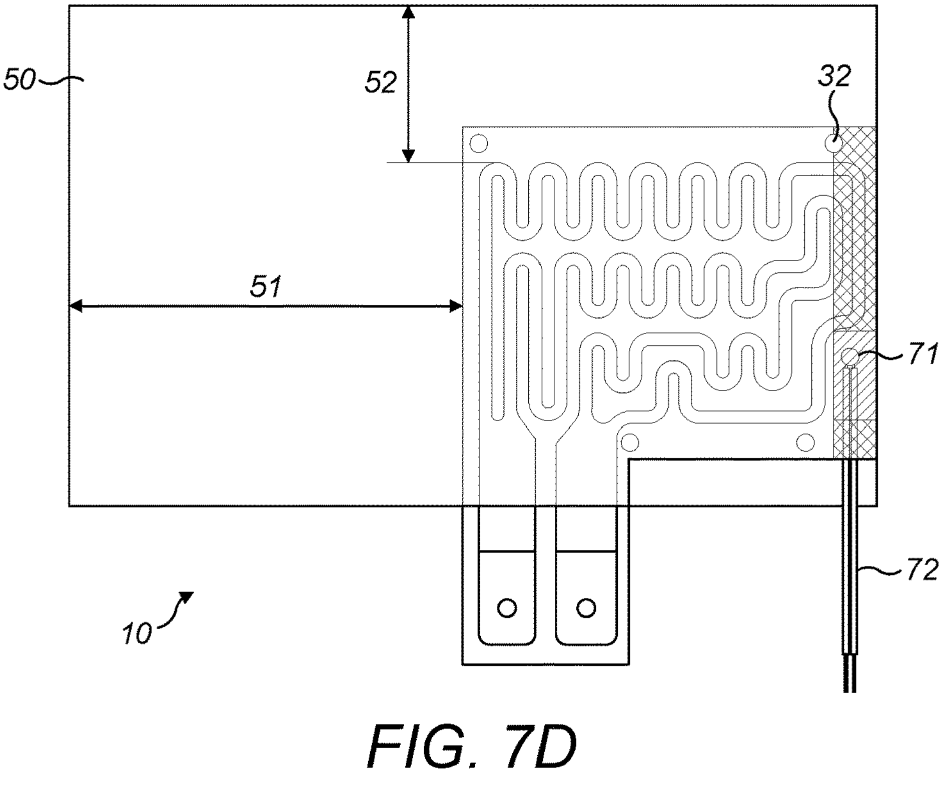

As with the thin film heater subassembly 10 of FIG. 6, the heat shrink 50 is then attached to directly to the surface of the heating element 20 and the supporting adhesive surface of the backing film 30 so as to enclose the heating area 22 formed by the heater track 21 together with the temperature sensor head 71 and a portion of the connections 72, as shown in FIGS. 7C and 7D. The thin film heater assembly 10 of FIG. 7D can then be attached directly to a heating chamber 60 as shown in FIG. 6C. The provision of a thermistor hole therefore provides allows for the heat shrink method to be used to both seal the heater element 20 and thermistor 71 and as the means of attaching the thin film heater to the chamber but also allows the thermistor sensor head 71 to be in direct contact with the heating chamber 60 through the thermistor hole 37*a*.

As clear from FIGS. 7A and 7B, in this example the flexible dielectric backing film 30 additionally includes a foldable portion 38 in the form of the tab 38 formed by two cuts in the backing film allowing the tab 38 to fold over on itself into the vacant region 22*v* into which the thermistor 70 is positioned. In this example the tab 38 is at an intermediate position along the free edge region 32 but it might equally be formed by one cut to provide a bottom part of the free edge region which can fold over the thermistor 20 when positioned. In this example the tab 38 includes thermistor hole 37*b* which aligns with the thermistor hole 37*a* provided in in the vacant region 22*v* of the flexible dielectric backing film 30 formed by the shape of the heating track 21. The thermistor hole 37*b* is not essential and the tab 38 may an uninterrupted surface portion which does not contain a hole, such that it folds over the thermistor leaving the thermistor only visible through the thermistor hole 37*a*. Thermistor hole 37*b* may also be used for alignment in some examples, as discussed further below. The backing film tab 38 is then folded over the thermistor 70 such that the thermistor hole 37*b* aligns with thermistor hole 37*a* and is attached via the silicon adhesive provided on the attachment surface of the backing film 30. In this way, the thermistor is attached to the backing film with the sensor head 71 attached between the backing film 30 and the folded tab 38 of the backing film which is glued in place, with the thermistor connection 72 extending in the direction approximately corresponding to that of the heater contact legs 23. This process serves to initially attach the thermistor 70 in position before the heat shrink 50 is aligned and attached with the thin film heater 10.

The thin film heater subassembly 10 of FIG. 7 also has a number of additional features for precisely and reproducibly aligning the heating element 20 and thermistor 70 relative to the heating chamber 60. In particular, a series of alignment holes 34, 54 are provided in both the backing film 30 and heat shrink 50 which can be used for the relative alignment of the backing film 30 and heat shrink 50. The backing film 30 is provided with a number of alignment holes 34*a*, 34*b*, 34*c*, 34*d*, 37*b* positioned in the backing film so as to be provided around the heating element 20. In particular, two alignment holes 34*a*, 34*b* are provided along a top edge of the backing film 30 so as to be positioned above the heating element 20 when it is attached to the backing film 30. Two further align the holes 34*c*, 34*d* are provided below the heating area 22 of the heating element 20. The thermistor hole 37*b* may also act as an alignment hole in some examples. The heat shrink film 50 has a plurality of alignment holes 54 which correspond in relative position to those alignment holes 34 of the backing film 30. The alignment holes 34, 54 are arranged such that when the holes of the backing film 30 are brought into alignment with the alignment holes 54 of the heat shrink 50, the heat shrink 50 is positioned at precisely the correct position relative to the thin film heater 10 such that the heat shrink 50 extends beyond the heating area 22 by the correct lengths 51, 52 to allow for precise alignment of the heating element 20 relative to the heating chamber 60 when attached.

The heat shrink 50 may then aligned relative to the thin film heater 10 using a positioning fixture, as shown in FIG. 7C. The positioning fixture may comprise a supporting surface 82 with projecting alignment pins 81 which correspond in their relative displacement to the positions of the alignment holes 34, 54 on the backing film 30 and the heat shrink 50. By positioning first the thin film heater (comprising the heating element 20 attached to the backing film 30) and secondly the heat shrink film 50 on the surface of the alignment fixture 80 such that the alignment pins 81 extend through the backing film alignment holes 34, the heat shrink 50 is aligned precisely relative to the heating element 20 and backing film 30. In particular, when the alignment holes 34 in the backing film 33 and the alignment holes 54 in the heat shrink are aligned the heat shrink 50 extends beyond the heating element 20 in a direction opposite to the contact legs to provide a specific predetermined length of the alignment portion 52 and a specific predetermined length of extension of the wrapping portion 51.

Once the heat shrink 50 is correctly positioned, the remaining peripheral edge region 32 of the backing film 30 which is left free by the positioning of the heat shrink 50 is folded over on top of the heat shrink as shown in FIG. 7D to seal this edge of the backing film 30 and heat shrink 50 layers as described above. The assembled thin film heater sub-assembly 100 shown in FIG. 7D can then be attached to the heating chamber 60 as described above in reference to FIGS. 6C and 6D. The wrapping of the thin film heater subassembly 100 onto the chamber 60 can be performed by hand as shown in FIG. 2E or equally this can be carried out in an automated process by a device which rotates the heating chamber 60 relative to the thin film heater to secure it in place. As described above, the thin film heater assembly 10 is sealed to the heating chamber 60 via heating to shrink the heat shrink 50 to secure the heater tightly against the outer surface of the heating chamber 60.

Once the thin film heater subassembly 10 is attached to the heating chamber 60, the resulting heater chamber subassembly 100 can then be employed in a heating device, such as an aerosol generating device, by connecting the thermistor connections 72 and the heated contact legs 23 to a PCB and power source. An aerosol generating device incorporating the thin film heater 10 and heater assembly 100 of the present invention has significant advantages in performance compared to known devices. In particular, because the temperature sensor 70 is positioned in close proximity to the heating element 20 and the heating chamber 60, the heating temperature may be measured with increased precision. In turn this allows for a more precise control of the heating temperature of the device, which is particularly beneficial in the context of controlled temperature aerosol generating devices where a specific heating temperature must be maintained to provide efficient aerosol generation without burning the aerosol generating substance or exceeding the working temperature range of the device components. The heater assembly according to the present invention is also easier to assemble, requires fewer parts and, since the temperature sensor is incorporated within the thin film heater, ensures the temperature sensor is maintained at the correct position throughout the lifetime of the device.

The invention claimed is:

1. A heater assembly for an aerosol generating device comprising:

a flexible heating element;

a temperature sensor;

a flexible dielectric backing film with an adhesive on a surface of the flexible dielectric backing film, wherein the temperature sensor and the flexible heating element are supported adjacent to each other on the adhesive on the surface of the flexible dielectric backing film; and a tubular heating chamber;

wherein a thin film heater subassembly includes the flexible heating element, the temperature sensor and the flexible dielectric backing film, and wherein the thin film heater subassembly is wrapped around a surface of the heating chamber with the temperature sensor held adjacent to the heating chamber.

2. The heater assembly of claim 1, further comprising:

a second flexible dielectric film which opposes the flexible dielectric backing film to at least partially enclose the heating element; wherein at least a portion of the temperature sensor is positioned between the flexible dielectric backing film and the second flexible dielectric film.

3. The heater assembly of claim 2, wherein the second flexible dielectric film comprises a layer of heat shrink material which opposes the flexible dielectric backing film.

4. The heater assembly of claim 2, wherein the flexible dielectric backing film comprises an edge region which is folded over on itself or over the second flexible dielectric film to at least partially enclose the temperature sensor within the fold.

5. The heater assembly of claim 2, wherein the temperature sensor comprises a temperature sensor head and electrical connections arranged to transport signals from the temperature sensor head; wherein the temperature sensor head is enclosed between the flexible dielectric backing film and the second flexible dielectric film.

6. The heater assembly of claim 2, wherein the temperature sensor comprises a temperature sensor head and electrical connections arranged to transport signals from the temperature sensor head; wherein the flexible dielectric backing film comprises an opening or a through-hole in the flexible dielectric backing film and the temperature sensor is positioned such that the temperature sensor head lies on the opening or the through-hole and is exposed through the flexible dielectric backing film.

7. The heater assembly of claim 2, wherein the flexible heating element is a planar heating element comprising a heater track which follows a circuitous path over a heating area within a plane of the planar heating element and two contact legs for connection to a power source, the two contact legs extending away from the heater track in the plane of the planar heating element; wherein at least the heating area of the planar heating element is enclosed between the flexible dielectric backing film and the second flexible dielectric film.

8. The heater assembly of claim 7, wherein the circuitous path is shaped so as to leave a vacant region on the flexible dielectric backing film, unoccupied by the planar heating element; wherein the temperature sensor is held by the adhesive in the vacant region of the flexible dielectric backing film.

9. The heater assembly of claim 7, wherein the temperature sensor comprises a temperature sensor head and elongated electrical connections, the elongated electrical connections oriented substantially in a same direction as the two contact legs of the planar heating element.

10. The heater assembly of claim 1, wherein the flexible dielectric backing film comprises a first piece of film which supports the flexible heating element and a second piece of film which supports the temperature sensor, the first piece of film attached to the second piece of film.

11. The heater assembly of claim 1, wherein the flexible dielectric backing film comprises Polyimide.

12. The heater assembly of claim 1, wherein the flexible dielectric backing film comprises PTFE.

13. The heater assembly of claim 1, wherein the heating chamber comprises one or more indentations on an outer surface of the heating chamber and the thin film heater subassembly is wrapped around the heating chamber such that at least part of the temperature sensor is positioned within an indentation of the one or more indentations.

14. An aerosol generating device comprising the heater assembly according to claim 1.

15. A heater assembly for an aerosol generating device comprising:

a flexible heating element;

a temperature sensor;

a flexible dielectric backing film with an adhesive on a surface of the flexible dielectric backing film, wherein the temperature sensor and the flexible heating element are supported adjacent to each other on the adhesive on the surface of the flexible dielectric backing film; and a second flexible dielectric film which opposes the flexible dielectric backing film to at least partially enclose the heating element; wherein at least a portion of the temperature sensor is positioned between the flexible dielectric backing film and the second flexible dielectric film, wherein the flexible dielectric backing film comprises an edge region which is folded over on itself or over the second flexible dielectric film to at least partially enclose the temperature sensor within the fold.

16. A heater assembly for an aerosol generating device comprising:

a flexible heating element;

a temperature sensor;

a flexible dielectric backing film with an adhesive on a surface of the flexible dielectric backing film, wherein the temperature sensor and the flexible heating element are supported adjacent to each other on the adhesive on the surface of the flexible dielectric backing film; and a second flexible dielectric film which opposes the flexible dielectric backing film to at least partially enclose the heating element; wherein at least a portion of the temperature sensor is positioned between the flexible dielectric backing film and the second flexible dielectric film, wherein the temperature sensor comprises a temperature sensor head and electrical connections arranged to transport signals from the temperature sensor head, and wherein the flexible dielectric backing film comprises an opening or a through-hole in the flexible dielectric backing film and the temperature sensor is positioned such that the temperature sensor head lies on the opening or the through-hole and is exposed through the flexible dielectric backing film.

* * * * *